Figure 3:
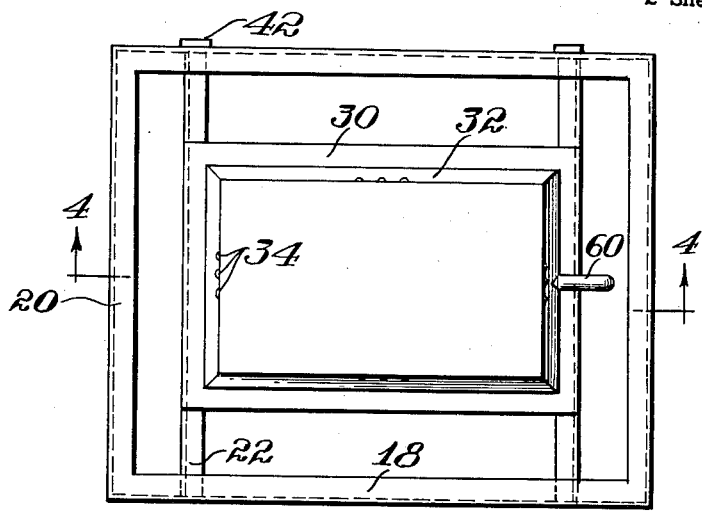

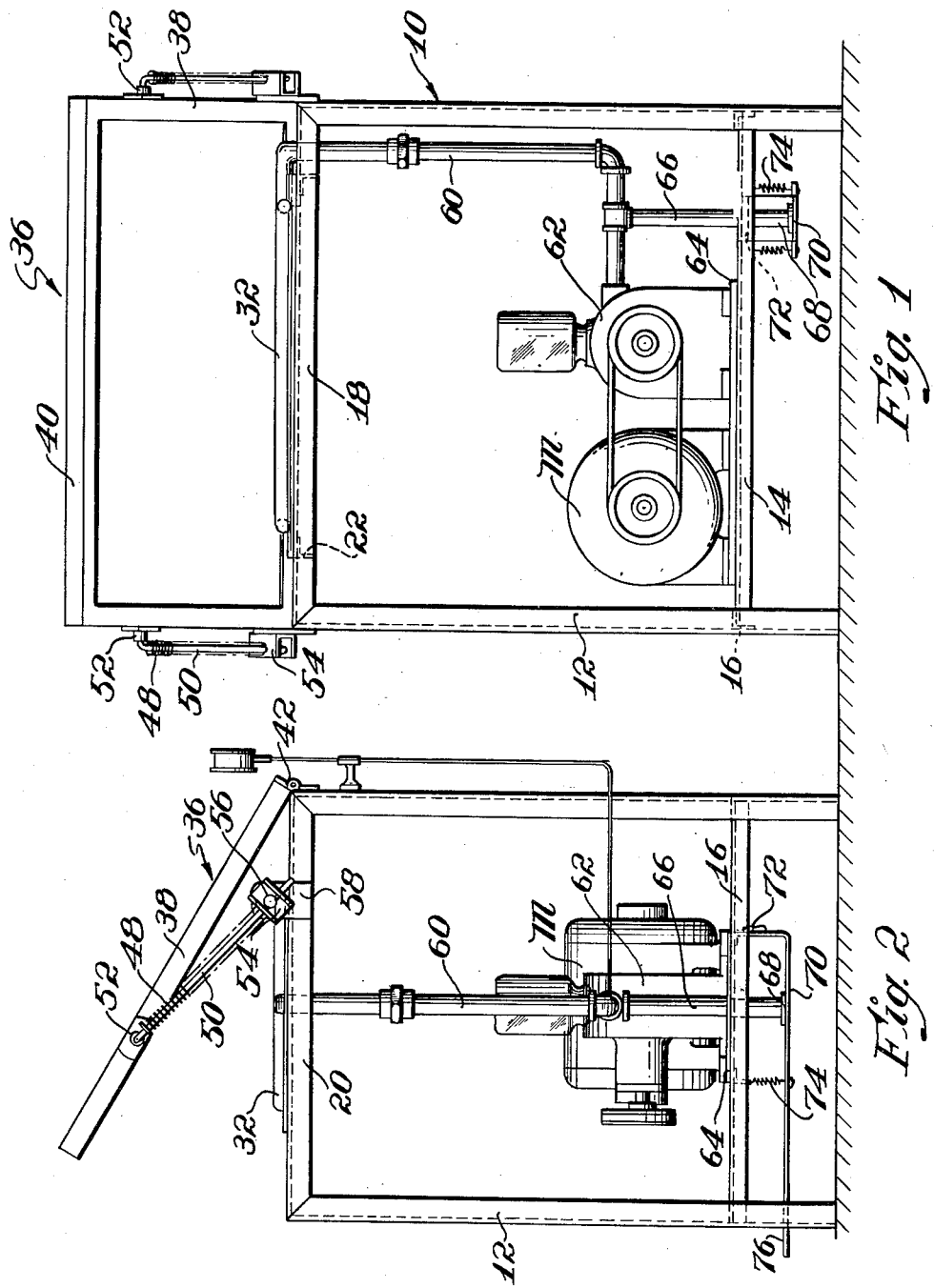

Nov. 27, 1956   J. W. STEWART   2,771,619
VACUUM PRESS FOR BOOT AND SHOE MANUFACTURE
Filed Dec. 2, 1953   2 Sheets-Sheet 2

Inventor
James W. Stewart
by Roberts, Cushman & Grover
Att'ys.

United States Patent Office 2,771,619
Patented Nov. 27, 1956

2,771,619
VACUUM PRESS FOR BOOT AND SHOE MANUFACTURE

James W. Stewart, Providence, R. I., assignor to Marbill Company, Providence, R. I., a corporation of Rhode Island Application December 2, 1953, Serial No. 395,719

2 Claims. (Cl. 12—1)

This invention relates to the manufacture of rubber shoes and boots and more especially to an apparatus for consolidating the component layers of rubber and fabric of which they are composed prior to coalescence by vulcanization.

According to a prevailing method of manufacturing rubber and rubber-like boots and shoes, suitably shaped sheet material cut from uncured rubber and fabric coated with uncured rubber cement or impregnated therewith are applied one after another to the surface of a rigid mold or last of the desired shape and size to build up a boot or shoe of the desired kind, the uncured rubber being sufficiently tacky so that the parts stick to each other without need for sewing operations. After the parts have been put together and the boot is vulcanized, the parts lose their tackiness and coalesce to form a unitary structure. Prior to vulcanizing the assembled parts, however, it is customary to consolidate the parts to insure adhesion by applying pressure, for example, by means of rolls applied to the surfaces to squeeze out air bubbles which may be included between the surfaces and which if allowed to remain would cause blisters in the completed shoe. This rolling is commonly done by hand, is slow, laborious and not entirely successful because of the fact that the surfaces are of varying contour, making it very difficult to reach every part of the surface areas except by excessive manipulation which becomes prohibitive from the standpoint of manufacturing costs. Furthermore, in some types of boots or shoes it is customary to apply (as one of the outside pieces) the foxing strip which extends around the lower part of the shoe, having an ornamental outer surface, for example, a surface which is pebbled, cross ribbed or the like. Since the rolling operation takes place before the material has been cured, there is a tendency to obliterate these ornamental effects or at least to detract from the desired appearance.

The principal objects of the present invention are to provide an apparatus designed to accomplish the same objects as the rolling operation but to do it much more expeditiously and cheaply while at the same time avoiding damage to the ornamental exterior of the surfaces.

In accordance with the present invention a complete elimination of the air bubbles included between the interfaces and a complete and intimate contact of the parts under a uniform pressure without adversely affecting the exterior surfaces is effected by placing the mold with the parts applied thereto between flexible elastic diaphragms and then evacuating the air from between them so as to bring the marginal edges of the diaphragms together about the last and to extract substantially all of the air from the cavity occupied by the lasted shoe. As herein illustrated the diaphragms are mounted on frame members which are relatively movable with respect to a manifold situated therebetween to form a closed chamber constituted by the inner wall of the manifold and the diaphragms, within which the lasted shoe may be placed. The manifold is connected to a vacuum pump and has in it a plurality of orifices through which air may be removed from between the diaphragms so as to extract all of the air and cause the diaphragms to conform closely to the surface contour of the last. Preferably, one of the frame members constitutes a support on which one of the diaphragms is stretched and fastened in a substantially horizontal position and the other frame member is hinged thereto for angular movement from an elevated out-of-the-way position to an operative position substantially parallel to the first diaphragm. The manifold is fastened to the support above the first diaphragm so as to lie between the diaphragms and is of such internal size to accommodate a last lying on its side. The hinged frame is normally held elevated by yieldable means and is depressed into engagement with the upper side of the manifold by hand or drawn down into engagement therewith by a suitable treadle and rod. A suitable valve is provided for breaking the vacuum so that the diaphragms may be separated and the shoe removed.

Figure 4:
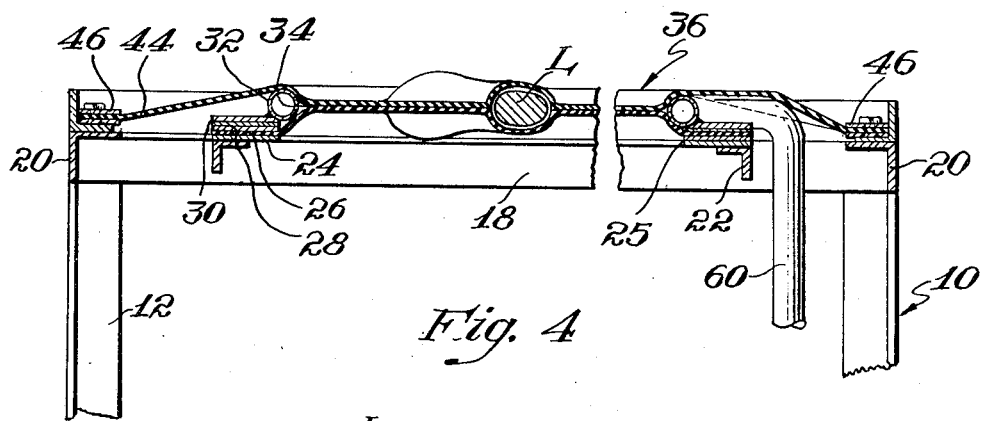
Figure 5:
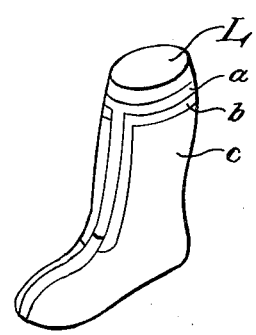

The invention will now be described in greater detail with reference to the accompanying drawings wherein:

Fig. 1 is a front elevation of the machine;
Fig. 2 is a side elevation of the machine;
Fig. 3 is a top view of the machine with the hinged frame omitted;
Fig. 4 is a vertical section taken on the line 4—4 of Fig. 3; and
Fig. 5 is a perspective view of a last illustrating the mode of applying the component parts of a boot to the last prior to operating upon it with the apparatus of the present invention.

Referring to the drawings, the machine has a rigid angle-iron frame 10, consisting of four legs 12, joined near their lower ends by horizontally arranged angle members 14—14 and 16—16 and at their upper ends by horizontally arranged angle members 18—18 and 20—20, the top of the frame being substantially waist high. Across the top of the frame there is mounted a pair of spaced horizontal angle bars 22—22 (Fig. 3) between which is supported a rigid substantially rectangular frame plate 24 (Fig. 4) having a rectangular opening 25 therein of such size as to normally accommodate on its side a last L such as illustrated in Fig. 5 having applied to it, for example, a plurality of uncured parts a, b and c of suitable shape and size to form a boot of the desired characteristics. A flexible elastic diaphragm 26 (Fig. 4) is stretched across the frame plate 24 with its marginal edges in contact therewith. A second rigid rectangular frame plate 28 like the first frame plate 24, is placed over the marginal edges of the diaphragm so as to sandwich the latter between it and the first frame plate. A third rigid frame plate 30 is then mounted on the plate 28 and has fast to its inner edge a manifold 32 which is in the form of a hollow tube or pipe which follows the inner rectangular edge of the frame. The plates 24, 28 and 30 together with the margin of the diaphragm are suitably fastened together and to the transversely extending bars 22—22 by bolts, rivets or other analogous fastening means. While the manifold is shown as having a circular cross section and the frame plates having rectangular openings therein, it is obvious that either may be changed or varied in shape without departing from the spirit or scope of the invention. The diaphragm is referred to as being both flexible and elastic and may be comprised of rubber, rubber reinforced with fabric, plastics having suitable elasticity, leather and so forth.

A rigid substantially rectangular frame 36 (Figs. 1 and 2) consisting of side and end angle bars 38 and 40, joined together in suitable fashion is pivotally mounted on the top of the support 10 by hinges 42—42 (Fig. 2) so that it may be moved from an elevated out-of-the-way position to a position in contact with the top of the support. A flexible elastic diaphragm 44 is stretched across the frame 36, its edges being secured to the sides and ends of the frame by rigid straps 46, bolted, riveted or otherwise fastened to the sides and ends. The frame 36 is normally held elevated by coiled springs 48, mounted on rods 50, one end of each rod being pivoted in a socket plate 52 attached to a side member of the frame 36 and the other slidably engaged with a bracket plate 54 pivoted at 56 on an upstanding ear 58, fastened to the support 10. As thus constructed the springs 48 yieldably hold the frame 36 angularly elevated with respect to the top of the support, permitting it to be depressed manually by an operator but re-elevating it immediately upon release. The manifold 32 as will be seen by reference to Fig. 4 is elevated with respect to the top of the support so that when the frame 36 is depressed into contact with the top of the support the diaphragm 44 is stretched downwardly over the top of the manifold. The manifold has peripherally of its inner side wall a plurality of apertures 34 and is connected by a pipe 60 to a vacuum pump 62 driven by a motor m, the pump and motor being mounted on a shelf 64 fastened in a horizontal position to the lower angle bars.

In normal operation of the apparatus the vacuum pump 62 is driven continuously so as to draw air inwardly through the orifices 34 in the manifold. A boot or shoe to be operated upon assembled on a last L is placed on the lower diaphragm 26 substantially centrally thereof and then the operator depresses the hinged frame 36 so as to bring the upper diaphragm 44 into contact with the upper side of the manifold. As the diaphragm 44 is brought into engagement with the upper side of the manifold it encloses the shoe conforming roughly to its shape. The frame 36 when engaged with the support, stretches the margins of the diaphragm across the top of the manifold preventing ingress of air to the cavity formed by the inner wall of the manifold and the opposed diaphragm and since air is being extracted continuously from this space through the orifices 34, a vacuum is produced which draws the diaphragms marginally of the shoe into contact with each other and with the surface of the last and as the vacuum is perfected a uniform pressure of nearly 15 pounds per square inch is applied to the entire surface of the last thus squeezing any bubbles of air which may be trapped between the interfaces of the shoe parts and extracting them so that the parts are intimately consolidated under sufficient pressure to insure complete interfacial contact of the parts. This extraction of the air and consolidation of the parts on the last may be effected in the matter of a few minutes whereupon the vacuum is broken thereby releasing the frame 36 which then automatically rises to its inoperative position by reason of the compulsion of the springs 48.

To break the vacuum the pipe 60 has connected to it a branch 66, the lower end 68 of which is covered by a flat valve plate 70 hinged at 72 to an angle bar stretched between the lower cross bars 16—16 and normally held in contact with the lower end of the pipe by springs 74—74. The valve plate 70 has a forwardly projecting portion 76 constituting a treadle which may be depressed by foot to separate the valve plate 70 from the lower end of the pipe 66 and hence to admit air thus breaking the vacuum, releasing the pressure on the upper diaphragm and allowing the frame 36 to rise under the compulsion of the springs 48.

The device as thus constructed provides a very simple and efficient piece of apparatus for consolidating the component parts of the boot or shoe assembled on the last in such fashion as to extract any air bubbles included between the interfaces of the parts and to press them into such intimate contact that in the following vulcanization process a complete coalescence of the interfaces is effected so that the finished boot or shoe has an upper which is comprised of parts so integrally united that there is no danger of separation during wear or entrance of moisture or water between the layers.

It should be understood that the present disclosure is for the purpose of illustration only and that this invention includes all modifications and equivalents which fall within the scope of the appended claims.

I claim:

1. Apparatus for operating on parts of rubber shoes comprising a support, a frame-like manifold fastened to the support in a horizontal plane, a flexible elastic diaphragm fastened to the support at the underside of the manifold so as to subtend the lower side of the manifold and to form therewith a shallow receptacle wherein the manifold constitutes a wall which rises from the diaphragm substantially above the support, said manifold having interiorly thereof exhaust ports, a carrier frame of larger area than the manifold pivotally mounted on the support for movement downwardly over the upper side of the manifold into contact with the support, means on the support for limiting downward movement of the carrier frame to a position in contact with the support below the top of the manifold a second flexible elastic diaphragm stretched taut on the carrier frame and movable therewith into contact with the manifold when the carrier frame is seated against the limit means on the support, means for exhausting air through the ports to the manifold from the space between the diaphragms when the movable diaphragm is in contact with the manifold, means operable to break the vacuum, and means normally operating to hold the movable diaphragm in an inoperative position away from the fixed diaphragm, said means being yieldable to permit the movable diaphragm to be moved into operative position with respect to the fixed diaphragm, and automatically operable to restore the movable diaphragm when the vacuum is broken to its inoperative position.

2. Apparatus for operating on parts of rubber shoes assembled on a rigid last to build up a shoe of the desired kind, comprising a frame-like manifold and spaced diaphragms associated therewith, defining a chamber within which the article may be placed between the diaphragms, one of said diaphragms being fixed at its edges with respect to a side of the manifold with which it is associated, a frame supporting the other diaphragm for bodily movement to and from the opposite side of the manifold, said movable diaphragm being of larger area than the fixed diaphragm, and said supporting frame being movable downwardly over the manifold to a place below the plane of the upper side thereof to cause the central part of the movable diaphragm to contact the top of the manifold and its margins to be drawn downwardly over the outer edges of the manifold to provide a continuous arcuate seal peripherally of the manifold, said manifold having internally thereof a plurality of suction ports for exhausting air from the space between the diaphragms after the movable diaphragm is stretched taut against the manifold.

References Cited in the file of this patent

UNITED STATES PATENTS

| 1,712,648 | Campbell | May 14, 1929 |
| 1,725,454 | Heyl | Aug. 20, 1929 |
| 2,308,453 | Potchen et al. | Jan. 12, 1943 |
| 2,350,831 | Schubert et al. | June 6, 1944 |
| 2,441,097 | Hicks | May 4, 1948 |
| 2,584,401 | Thralls | Feb. 5, 1952 |
| 2,651,061 | Polleys | Sept. 8, 1953 |
| 2,651,062 | Smiley | Sept. 8, 1953 |

FOREIGN PATENTS

| 494,885 | Great Britain | Nov. 3, 1938 |